Patented June 12, 1951

2,556,854

UNITED STATES PATENT OFFICE 2,556,854

MAGNETIC COUPLING DRIVE FOR HIGH-PRESSURE STIRRED REACTORS

Harry E. Spears, Westfield, and Ivan Mayer, Summit, N. J., assignors to Standard Oil Development Company, a corporation of Delaware Application October 29, 1949, Serial No. 124,274

7 Claims. (Cl. 172—284)

1

The present invention relates to a magnetic coupling drive mechanism, and more particularly, to a mixing apparatus employing a magnetic coupling between a driving shaft and a driven shaft of which the latter is contained in a completely enclosed mixing chamber. It is an object of the invention to provide means for driving a stirring mechanism in an enclosed chamber such as a reaction chamber normally maintained under high pressure. It is also an object of the invention to provide such apparatus for the purpose of avoiding pressure loss and leakage normally encountered where driving mechanisms must enter through the walls of high pressure apparatus. In the apparatus according to the present invention, the stirring mechanism is contained entirely within the mixing chamber and is driven by means of a magnetic coupling in which the driving element is separated from the driven element by a thin membrane of a substantially non-magnetic material, means being provided for neutralizing pressure on the membrane from within the mixing chamber.

Figure 1:
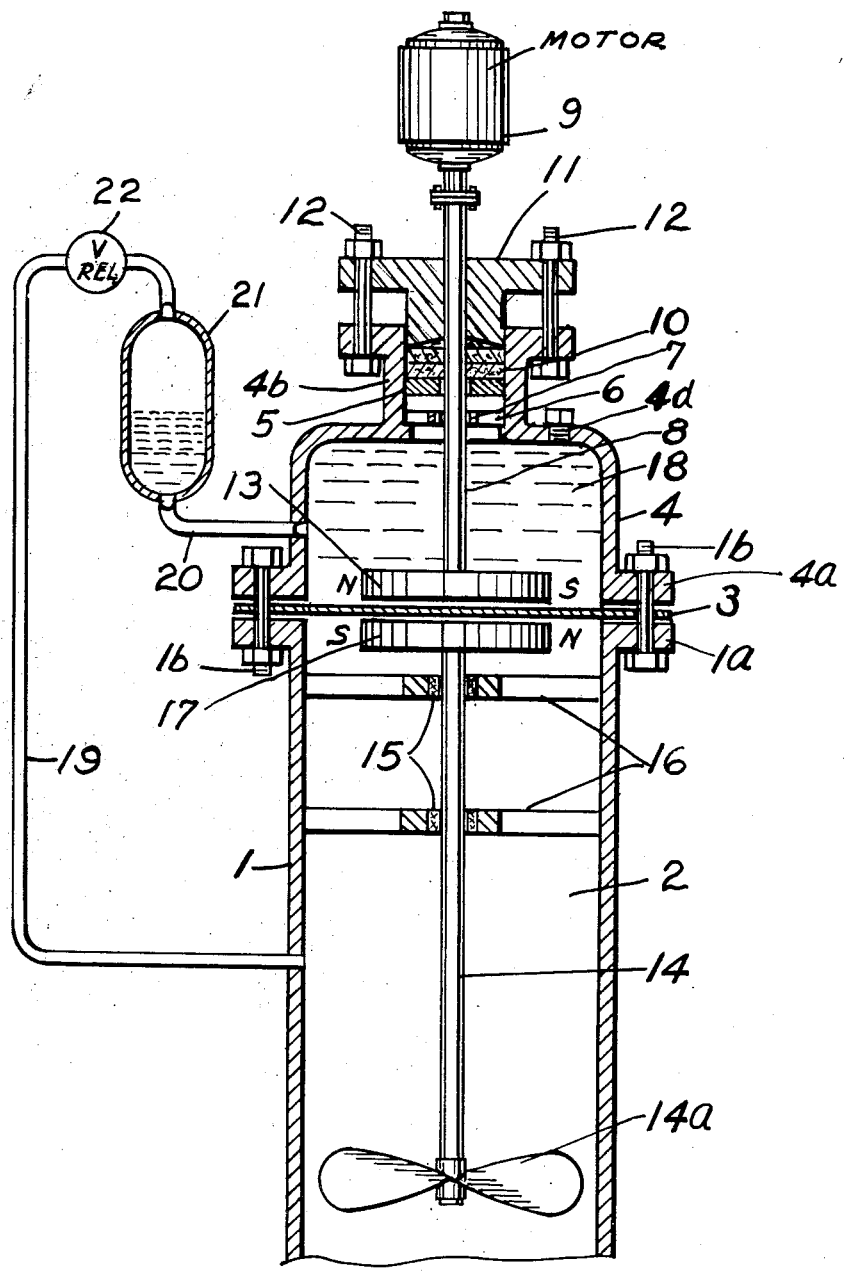
Figure 2:
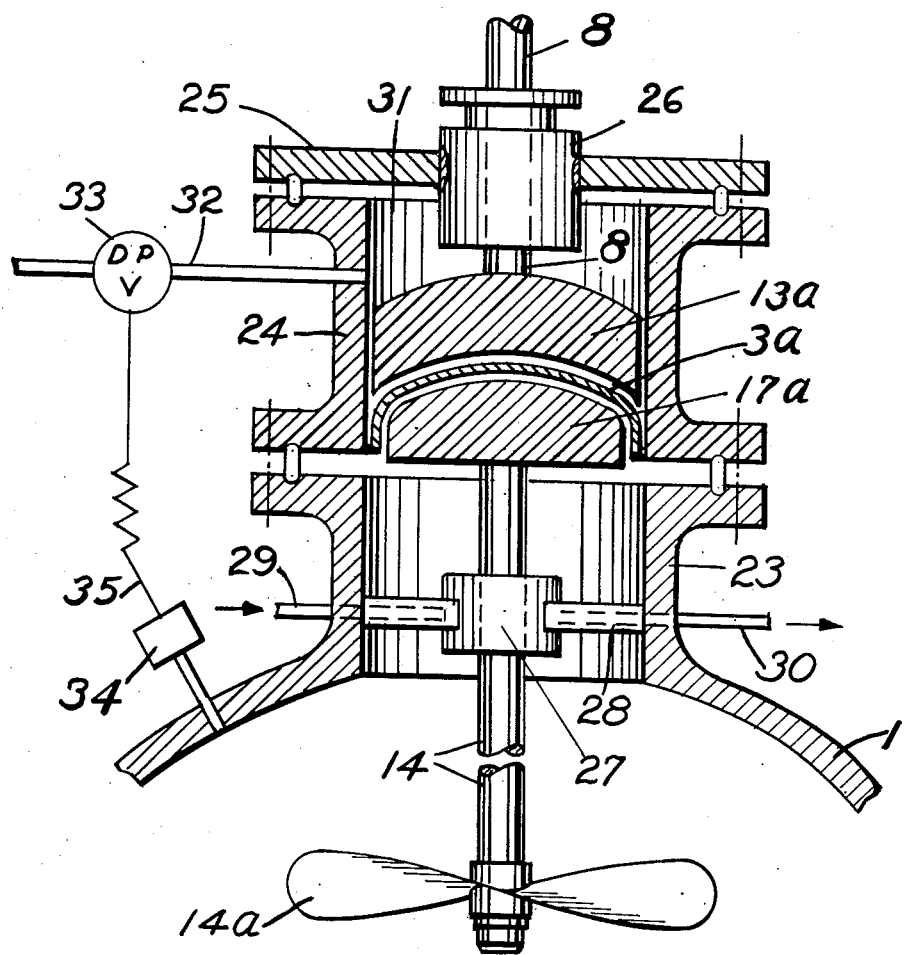

The invention and its objects may be more fully understood by reference to the accompanying drawings in which:

Fig. 1 is a side elevation, partly in vertical section, of a representative structure according to the invention, and Fig. 2 is a similar view of another form of such structure.

Referring more particularly to the drawings in which like numerals are employed to designate like parts of the structure illustrated, the numeral 1 designates a portion of a casing or container enclosing a chamber 2, such as a reaction chamber. The container has an open end flanged as at 1a. The open end of the container is sealed by means of a thin membrane or diaphragm closure 3, and a cap member 4 having a flanged portion 4a matching the flanged portion 1a of the container, and secured thereto by means of bolts 1b with the thin diaphragm held between the flanges separating the interior of the chamber 2 from the interior of the cap 4. The diaphragm closure element 3 is of a material offering a minimum resistance to passage therethrough of a magnetic force or flux. This material may be a di-electric material such as glass, plastic, or the like, or a substantially non-magnetic metal such as copper, brass, bronze, or non-magnetic stainless steel. As shown in Fig. 1, the closure element 3 is a flat disc.

The outer end of the cap 4 is provided with an annular flanged collar portion 4b. Interiorly and laterally of this collar portion is an annular shoulder portion 5, and a spider bearing support member 6 in which is disposed a bearing 7 concentrically thereof. A shaft 8 is extended concentrically through the collar shoulder portion and bearing, being connected at its outer end to a driving means such as motor 9. Packing 10 is provided around the shaft above the shoulder portion 5, and held in fluid-tight relation to the shaft and collar by means of a flanged packing gland element 11, bolts 12 being extended through the respective flanges of said collar portion and packing gland element to secure one to another and compress the packing. At the inner end of the shaft within the chamber, a driving coupling element 13 is mounted in closely spaced, substantially parallel relationship to the diaphragm 3.

Within the container or vessel 1, a stirrer shaft 14 is mounted in substantial alignment with the shaft 8, being supported therein by means of bearing elements 15 carried concentrically of a pair of lateral spider support members 16. The inner end of the shaft 14 is provided to carry a stirrer element such as an impeller 14a. The outer end of the shaft 14 terminates in closely spaced relation to the diaphragm 3, and is rigidly secured to a driven coupling element 17 disposed in substantially parallel, closely spaced relation to the under surface of the diaphragm opposite to the driving coupling element 13. Either or both of the coupling elements 13 and 17 may be permanent magnets or electro-magnets, or one element may be magnetized while the other is merely formed of a magnetic material.

In the structure as illustrated, the diaphragm 3 and the sealed cap 4 form between them a chamber 18. This chamber, as shown, is adapted to receive a body of a sealing liquid completely filling the cap. The liquid employed may be introduced into the cap as by way of a suitable filler opening closed as by filler plug 4d. The chamber 18 in cap 4 is provided for connection with the chamber 2 in the vessel 1 as by means of conduit lines 19 and 20 communicating respectively with the upper and lower portions of a trap means such as seal pot 21. The seal pot and conduit lines are arranged so as to permit liquid from the chamber to partially fill the pot and seal the chamber 18 from the chamber 2 in vessel 1. Where desired, a suitable vacuum or pressure relief valve 22 may be provided in the line 19 to prevent the possibility of drawing sealing liquid from the seal pot and chamber 18 into the chamber 2 in vessel 1, should the relationship between the vessel and cap chambers be reversed. Also, if desired, where the vacuum breaker or vacuum relief valve is employed, this may be connected to a source of inert gas, where entrance of air into the system would be undesirable.

Another form of the apparatus according to this invention is illustrated in Fig. 2. Here the vessel 1 is provided with a flanged neck 23, and a flanged collar portion 24 provided with an annular cover plate 25. The diaphragm closure for the vessel in this modification is a shaped member 3a, preferably of a thin, non-magnetic metal such as copper, or non-magnetic stainless steel. The diaphragm or closure 3a, as shown, is domed and secured to the inner edge of the collar 24 as by welding. Alternately, the diaphragm may be a disc having a domed center portion of a diameter substantially equal to the inner diameter of the collar held in place between the flanged collar and the flanged neck of the vessel. The domed or shaped diaphragm member is provided to increase resistance thereof to deflection under sudden pressure variations. Due to the thinness of the material contemplated for use and the normally close spacing between the coupling elements and the diaphragm, such deflection may result in undesired frictional contact between the diaphragm and the coupling elements. By shaping the diaphragm in the manner proposed, greater resistance to such distortion or deflection is provided.

Interiorly of the collar 24, disposed in closely spaced relation to the diaphragm 3a, is a driving coupling element 13a mounted on the inner end of the drive shaft 8. The surface of the coupling element 13a disposed adjacent the diaphragm 3a is suitably curved to conform to the shape of the diaphragm. The shaft 8 extends outwardly through the annular cover plate 25 concentrically of a combined bearing and packing gland member 26 secured in the central opening on the annular cover plate in fluid-tight relation thereto.

On the opposite side of the diaphragm 3a is a driven coupling element 17a mounted on the outer end of the stirrer shaft 14, in closely spaced relation to the diaphragm, and conforming to the shape thereof. The inner end of the shaft carries a stirrer element 14a, as described with reference to Fig. 1. The shaft 14 extends through a bearing element 27 mounted concentrically of a spider 28 disposed laterally of the collar 23. The bearing illustrated is one adapted for use where high temperatures may be encountered in the vessel, and is provided for circulation of a coolant fluid as by means of inlet and outlet conduits 29 and 30 opening through the walls of the collar 23 and communicating with suitable passageways in the arms of the spider 28 and in the bearing 27.

The flanged collar 24 cooperates with the diaphragm 3a, and the annular cover plate 25 to form a fluid-tight chamber 31 similar to the chamber 18 provided in the cap 4 of Fig. 1. In the modification illustrated, this chamber is connected as by conduit line 32 to a suitable source of positive or negative pressure, by means of which a pressure similar in nature and degree to that existing in the vessel 1 may be produced in the chamber 31, a pressure or vacuum pump, not shown, being connected to the line 32 for such purpose. The pressure in the chamber 31 is controlled or regulated so as to maintain a substantial pressure balance between the chamber and the interior of the vessel. As shown diagrammatically, suitable control means may consist of a differential pressure control valve 33 in the line 32, which is actuated by a pressure-responsive device 34 connected into the interior of the vessel 1, and to the differential pressure control valve. The pressure-responsive device 34 may be connected to the differential pressure control valve 33, in any conventional manner, for electrical or pneumatic actuation, or otherwise. Such a connection is shown diagrammatically in the drawing as by means of the line 35.

In operation, the contents of the chamber formed by the casing 1 may be stirred or agitated by rotation of the shaft 8 by means of the motor 9. Rotation of the shaft and the coupling element 13 or 13a secured thereto tends to distort the lines of force passing from one coupling element to the other, and the driven member of the pair of coupling elements is thereby forced to follow rotation of the driving member. The strength of the magnetic linkage of the two coupling elements is directly related to the density of the magnetic flux passing between them. In the apparatus as disclosed, high flux densities may be obtained by reason of the fact that the material of the diaphragm employed may be extremely thin, so as to offer a minimum resistance to the flow between elements. The use of such a diaphragm is made possible by balancing pressure against each surface of the diaphragm, either by employment of the trapped connecting line between the interior of the vessel and the interior of the chamber 18 as in Fig. 1, or by imposing a pressure derived from an external source on the outer surface of the diaphragm substantially equal to that exerted against the inner surface of the diaphragm from within the vessel 1, as illustrated by Fig. 2. In either form of the apparatus, a particular advantage is obtained by reason of the fact that, although the seal for the driving shaft 8 must be provided to resist the pressure imposed, normal leakage under such pressure is substantially limited to either the sealing liquid employed in the form illustrated by Fig. 1, or the fluid pressure applied from an external source as illustrated in Fig. 2. In either instance, such loss of the pressurizing material need not result in any change in the conditions existing in the vessel 1. Also, where inert sealing fluids are employed, such leakage as is encountered will have no detrimental effect on the apparatus itself, nor will it create any operating hazard. Lubrication of the bearing for the shafts 8 and 14 may be accomplished in any conventional fashion and, where the sealing liquid is a lubricating oil, the bearing, as bearing 7 in the cap 4 of Fig. 1, may be lubricated thereby. Self-lubricated bearings may also be employed.

What is claimed is:

1. A magnetic coupling device comprising, in a container having an open end, a closure for said end, including a hollow cap assembly and a diaphragm closure element of a substantially non-magnetic material laterally of said open end, separating said cap from the container and forming a fluid receiving chamber within the cap, a driving shaft rotatably mounted in said chamber extending outwardly therefrom, and having an inner end terminating adjacent the diaphragm, a driven shaft rotatably mounted within said container in alignment with said driving shaft, magnetic coupling elements mounted on the inner and outer ends of the respective shafts in opposed closely spaced relation to each other and opposite surfaces of said diaphragm, and means for balancing pressure on said diaphragm from within said chamber against the pressure thereon from within the container.

2. Apparatus according to claim 1, in which said means for balancing pressure on said diaphragm is a fluid conduit communicating between said chamber and container, and a liquid trap in said conduit.

3. Apparatus according to claim 1, in which said means for balancing pressure on said diaphragm is a fluid conduit communicating between said chamber and an external source of pressure, and a differential pressure control valve in said conduit adapted to regulate the pressure of a fluid applied to the chamber against said diaphragm through said conduit directly to equalize pressure against the diaphragm from within the container.

4. Apparatus according to claim 1, in which at least one of said coupling elements is an electromagnet.

5. Apparatus according to claim 1, in which at least one of said coupling elements is a permanent magnet.

6. A magnetic coupling device comprising, in a container having an open end, a flanged collar secured at one end to said container open end, a thin diaphragm of a substantially non-magnetic material separating the interior of said collar from the interior of said container, a cover plate for the other end of said collar forming with the collar and diaphragm a fluid receiving chamber interiorly of said collar, a driving shaft rotatably mounted in said chamber extending outwardly therefrom, and having an inner end terminating adjacent the diaphragm, a driven shaft rotatably mounted within said container in alignment with said driving shaft, magnetic coupling elements mounted on the inner and outer ends of the respective shafts in opposed closely spaced relation to each other and opposite surfaces of said diaphragm, and means for balancing pressure on said diaphragm from within said chamber against the pressure thereon from within the container.

7. A magnetic coupling drive comprising a magnetic driven element contained in a pressurized container, a magnetized driving element contained in a chamber exteriorly of said container, a thin diaphragm of a non-magnetic material separating said elements, and said container from the chamber, and means for equalizing pressure in said chamber against one surface of said diaphragm with the pressure in said container against the opposite surface of said diaphragm.

HARRY E. SPEARS.
IVAN MAYER.

REFERENCES CITED

The following references are of record in the file of this patent:

UNITED STATES PATENTS

| Number | Name | Date |
|---|---|---|
| 236,954 | Lyman | Jan. 25, 1881 |
| 1,945,338 | Terry | Jan. 30, 1934 |
| 2,373,609 | Stahl | Apr. 10, 1945 |
| 2,393,671 | Wolfe | Jan. 29, 1946 |
| 2,444,703 | Jones | July 6, 1948 |